United States Patent [19]

Loutfy et al.

[11] Patent Number: 4,559,215

[45] Date of Patent: Dec. 17, 1985

[54] PRODUCTION OF ANHYDROUS ALUMINUM CHLORIDE FROM HYDRATED ALUMINA

[75] Inventors: Raouf O. Loutfy; James C. Withers, both of Tucson, Ariz.

[73] Assignee: Atlantic Richfield Company, Los Angeles, Calif.

[21] Appl. No.: 519,795

[22] Filed: Aug. 3, 1983

[51] Int. Cl.[4] .............................................. C01F 7/58
[52] U.S. Cl. .................................. 423/496; 423/126; 423/495; 423/626
[58] Field of Search ................. 423/126, 495, 496, 626

[56] References Cited

U.S. PATENT DOCUMENTS

| 558,725 | 4/1896 | Gooch | 423/126 |
|---|---|---|---|
| 3,953,584 | 4/1976 | Danner et al. | 423/495 |
| 4,222,989 | 9/1980 | Belsky et al. | 423/126 |
| 4,264,569 | 4/1981 | Sinha | 423/495 |
| 4,331,636 | 5/1982 | Svoronos | 423/126 |
| 4,434,149 | 2/1984 | Withers et al. | 502/180 |
| 4,465,566 | 8/1984 | Loutfy et al. | 204/67 |
| 4,465,659 | 8/1984 | Cambridge et al. | 423/495 |

OTHER PUBLICATIONS

J. T. Baker Chemical Co., *Specification Catalog and Price List*, Phillipsburg, N.J. 1961, p. 28.

*Primary Examiner*—John Doll
*Assistant Examiner*—Jackson Leeds
*Attorney, Agent, or Firm*—James W. McClain; Stanley A. Becker; Roderick W. MacDonald

[57] ABSTRACT

A process is described for the direct chlorination of hydrated alumina (preferably alumina trihydrate) to aluminum chloride hexahydrate (ACH) by reaction with concentrated hydrochloric acid. Preferably all of the initial hydrated alumina is converted to ACH. The ACH partially calcined to form an amorphous mixture of aluminum oxides and oxychlorides. This mixture is then reductively chlorinated to form anhydrous aluminum chloride which is suitable as a source of electrolytically produced aluminum metal.

10 Claims, No Drawings

PRODUCTION OF ANHYDROUS ALUMINUM CHLORIDE FROM HYDRATED ALUMINA

TECHNICAL FIELD

The invention herein relates to the formation of chlorided aluminum products.

BACKGROUND ART

It has been known for some time that anhydrous aluminum chloride can be electrolytically reduced at low temperatures of about 700°–750° C. to produce aluminum and chlorine with less energy consumption than with Hall technology reduction of alumina. Over the years a number of processes have been described to produce aluminum chloride suitable for electrolytic production of aluminum. Some processes, such as those disclosed in U.S. Pat. Nos. 4,039,647 and 4,039,648, involve the direct chlorination of aluminum oxide materials derived from the Bayer Process under reducing conditions in a molten state. Other chlorination processes involve the chlorination of Bayer Process alumina using a solid carbon reductant, such as partially calcined coke, as taught and described in U.S. Pat. No. 4,284,607. A principal source of alumina in all cases, however, has been Bayer Process alumina. In the Bayer Process bauxite is mixed with a hot concentrated sodium hydroxide solution to dissolve the alumina and separate it from the other major components ("impurities") of the bauxite (silica, iron oxide and titania). The dissolved alumina is then crystallized as alumina trihydrate, $\alpha\text{-}Al_2O_3 \cdot 3H_2O$. Because the alumina trihydrate is formed in a sodium hydroxide environment, it contains a significant amount of soda (usually 0.4 to 0.6%; all percentages herein are by weight unless otherwise stated). This high soda level is also carried over to the product alumina. A high soda level in the product alumina is undesirable because of its effect on the operation of the fluid bed chlorination process to produce anhydrous $AlCl_3$. Soda consumes valuable chlorine as it is chlorinated, and the products of the chlorination of soda ($NaCl$ and $NaAlCl_4$) accumulate in the fluid bed, adversely affecting process operation and requiring frequent and costly shut-downs for cleaning of the bed. The high soda content alumina also causes difficulties in the separation step of entrained unreacted bed material (alumina and/or coke) and $AlCl_3$ from soda chlorination products.

Other chlorination processes have been described for the chlorination of relatively high purity alumina. The alumina is typically produced from the calcination of aluminum chloride hexahydrate, ($AlCl_3 \cdot 6H_2O$; "ACH"). For instance, in U.S. Pat. Nos. 4,465,566 and 4,465,659 assigned to the assignee of present application, ACH derived from acid leaching of aluminous material, such as clay, is partially calcined to produce a product which has low levels of soda and is active toward calcination. Because the ACH is formed in an acid environment, the alumina produced from its calcination has low levels of soda, commonly no more than 0.02%. Even though this alumina source is quite satisfactory for chlorination and production of anhydrous $AlCl_3$, the acid leaching of the aluminous raw materials is energy and capital intensive compared to caustic leaching of bauxite. It would therefore be advantageous to have a process for the production of anhydrous $AlCl_3$ that combines the economics of Bayer Process and the low soda levels in alumina of the acid leaching processes.

DISCLOSURE OF INVENTION

The invention herein is a process for the conversion of hydrated alumina to anhydrous aluminum chloride which comprises:

a. reacting a source of solid hydrated alumina with concentrated hydrochloric acid to convert at least a portion of the hydrated alumina to solid aluminum chloride hexahydrate;

b. recovering a solid product from the conversion, the product consisting essentially of aluminum chloride hexahydrate or a mixture of aluminum chloride hexahydrate and unreacted hydrated alumina;

c. partially calcining the solid product of step (b) to produce an amorphous mixture of aluminum oxides and oxychlorides with a low content of water and HCl; and d. chlorinating the mixture of step (c) in the presence of a reductant to form anhydrous aluminum chloride.

In a preferred embodiment the source of hydrated alumina is the product from the Bayer Process.

MODES FOR CARRYING OUT THE INVENTION

In the process herein, the raw material to be converted is hydrated alumina. Any form of hydrated alumina is suitable as a raw material, including alumina monohydrate and alumina trihydrate ("ATH"). In practice, it will be found that the most common raw material is the "Bayer alumina" described above. (For brevity in the remainder of this specification, the raw material will be considered to be ATH. It will be understood, however, that the process of this invention will be equally applicable to all other hydrated aluminas.)

The principal reaction of the first step of the present invention is the conversion of ATH to ACH by reaction with concentrated hydrochloric acid, according to the following reaction:

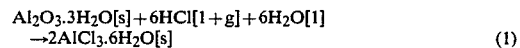

$$Al_2O_3 \cdot 3H_2O[s] + 6HCl[l+g] + 6H_2O[l] \rightarrow 2AlCl_3 \cdot 6H_2O[s] \quad (1)$$

For this reaction the concentration of the hydrochloric acid will be preferably in the range of 15–35% acid, preferably 20–30%. No additional water beyond that present as the concentrated acid solution is added. Additional concentrated acid and or gaseous HCl can be added as the reaction progresses or as additional ATH is fed to the process, so that the process may be run as either a batch or a continuous operation. If the acid concentration is reduced much below about 15%, the reaction rate will be significantly reduced and precipitation of the hydrated aluminum chloride will be curtailed.

The conversion reaction is believed to function to form the ACH precursor for partial calcination product by reactively dissolving both the hydrated alumina and the major portion of its included impurity oxides. The dissolved aluminous material then combines with the chloride portion of the hydrochloric acid to form ACH which in the defined range of acid concentration precipitates spontaneously as a solid. The impurity oxides, on the other hand, at this acid concentration remain substantially dissolved in the acid, so that the subsequent solid/liquid separation process separates high purity ACH from the impure solution. However, if the concentration of the acid is raised much beyond approximately 30-35%, impurities present in the raw material will also precipitate out with the ACH in significant quantities.

The acid conversion reaction is normally operated in the temperature range of 40°-120° C. in a closed vessel. The closed vessel prevents escape of any gaseous chloride materials and facilitates the recovery and recycle of the HCl and water. The reaction is conducted under nominally ambient pressure conditions, but during the course of the reaction there will be a small pressure increase within the closed vessel due to the vapor pressure of evolved HCl and water. The preferred temperature for the conversion is in the range of 70°-80° C., but that preferred range can vary depending on the particular materials from which the reaction vessel is constructed, due to differing degrees of resistance to the corrosive attack of the hot concentrated acid. The initial percent solids in the reaction mixture is in the range of 5-40%. The preferred range is 10-20%. At the end of the reaction, the slurry has a solids content in the range of 12-60% with the preferred value being between 25-50%.

The reaction will normally be run to complete conversion of the ATH and ACH. The actual reaction time will depend on the temperature of reaction, the amount of material to be reacted and the acid concentration, but will normally be in the range of from 15 to 150 minutes. During this conversion the ATH dissociates in the acid and the ACH forms as solid particles which are insoluble in the acid and precipitate to the bottom of the reaction vessel. Impurities which are present in the ATH are also dissolved in the acid but do not precipitate in significant amounts if the acid concentration is not excessive.

Following completion of the conversion reaction, the precipitated ACH (which may contain some unreacted ATH) is separated from the acid solution by conventional solid/liquid techniques. It is thereafter washed at least once (preferably several times) with highly concentrated (approximately 35%) HCl solutions to remove remaining traces of the reaction liquor. Washing with water or dilute acid is to be avoided, since the ACH will dissolve in such liquids. For that reason it is also desirable to keep the concentration of the wash acid as high as possible to minimize any redissolution of the ACH particles.

The separated acid is for economic reasons preferably recycled for reuse in the conversion step. Since it will contain some impurities, preferably also at least a portion of the recycle stream is treated to remove those impurities to prevent impurity build-up in the process stream.

Following recovery and washing of the ACH (and any unconverted ATH) the product is calcined at temperatures in the range of 200°-1000° C., preferably in the range of 500°-850° C. and most preferably in the range of 600°-750° C. for time periods sufficient to partially calcine (i.e., substantially dehydrate) the product. The times will be from about 30-240 minutes, typically about 120 minutes. During calcination a significant portion of the ACH and any unconverted ATH is thermally decomposed into active aluminous material and a hydrochloric acid-water vapor stream. The liberated HCl is advantageously recovered for reuse in the conversion of ATH to ACH.

ACH decomposes according to the general following reaction:

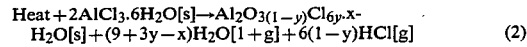

while the unconverted portion of the ATH decomposes according to the following reaction:

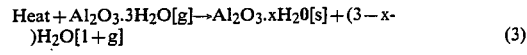

The ACH decomposition reaction (2) is the only reaction involved when the ATH is fully converted, as preferred herein. When the ATH is only partially converted, both reactions (2) and (3) occur during calcination. The ACH (along with any unconverted ATH is heated for a time and at a temperature sufficient to reduce the residual hydrogen content (i.e., the x in equations (2) and (3)) while maintaining as high a level as possible of residual chloride (i.e., the y in equation (2)) in the solid product and to produce a highly active product for the subsequent chlorination. The necessity for low residual hydrogen content is to minimize the loss of chlorine to hydrogen chloride during the chlorination stage by reaction with the residual hydrogen according to the equation:

It may be calculated from the combining ratios of hydrogen and chlorine that for every 1 kg of combined residual hydrogen as much as 35 kg of chlorine will be converted to hydrogen chloride. Accordingly, the levels of hydrogen in the calcined product are crucial in determining the economic viability of the process. High residual chloride levels serve to reduce the consumption of valuable chlorine in the subsequent chlorination step. The partial calcination of ACH will also remove the major portion of water and HCl from the ACH producing what is believed to be a mixture of aluminum oxides and oxychlorides.

The optimum calcination temperature of the fully or partially converted ATH is that temperature which results in the highest molar ratio of Cl/H. The residual hydrogen level in the calcined product is a function of calcination temperature. To produce acceptable feed material for the subsequent chlorination, the calcination temperature should, as described above, be in the range of 350°-1000° C.

Additionally, although the level of chloride decreases with increasing calcination temperatures, as expected, it has also been found that there is only a gradual decrease in residual chlorine in the temperature range from 450° C. to 700° C. and that above about 750° C. the chlorine levels drop sharply to a lower level in the temperature range from 750° C. to 1000° C. Indeed, by calculating the molar ratio of residual chlorine to residual hydrogen, it has been found that there is an optimum temperature range for the calcination of 500° C. to 850° C., preferably between 600° to 750° C., where the molar ratio of Cl/H approaches one. These calcination temperature ranges thus optimize the product in regard to the chlorine utilization in the subsequent chlorination process step. The 350° C. minimum reflects the lower limit of practical reaction rates, while above the 1000° C. maximum chlorine is rapidly drawn off rather than being retained to participate in the subsequent chlorination step.

The ACH product from ATH conversion may be fed to a multiple-hearth furnace for calcination, in which case it passes through the furnace countercurrent to the upward gas flow. The particles are fed to the top hearths of the furnaces and fall slowly from hearth to hearth, being simultaneously dried and decomposed. During operation, the center shaft rotates slowly and the material on each hearth is raked to a discharge point. The alumina discharged from the furnaces is cooled and transferred to the final product storage bins.

Alternatively, ACH can be heated in a two-stage decomposer/calciner. The decomposer is an indirectly heated, fluidized-bed reactor operating at 200° C. to 400° C. The indirect-fired decomposer off-gases are cleaned, cooled, and sent to acid recovery. Approximately 25% of this cooled gas is recycled to the decomposer by a blower which maintains fluidization of the ACH bed. The calciner is a direct-fired, fluidized-bed reactor or multiple-hearth roaster that operates between 450° C. and 1000° C. About 90% of the ACH decomposition occurs in the decomposer; the remaining decomposition occurs in the calciner. The gas streams from both are then sent to the acid-recovery area.

As another alternative, ACH may be calcined in an indirectly heated flash calciner or rotary kiln which permits efficient HCl gas-handling and recycling.

Following the thermal decomposition of the fully converted or partially converted ATH according to the present invention, the partially calcined product is subjected to a reductive chlorination to produce the desired anhydrous aluminum chloride. All the oxide impurities in the product will chlorinate during this reductive chlorination step to produce their respective chlorides. Thus, $Na_2O$ will be chlorinated to NaCl, $NaAlCl_4$ and $Na_3AlCl_6$. The impurity levels in the partially calcined product dictates the total chlorine loss and the minimum chlorination temperature. The minimum operating chlorination temperature is the temperature at which components of chlorination vapor pressure are high enough to remove feed impurities as vapors at the same rate the impurities are introduced so that the impurities will not accumulate in the reactor. This a function of impurities level, particularly of the soda level in the feed product, for a higher soda level requires a higher temperature to remove the soda-derived impurities. However, this also allows the operator to compensate for different soda impurity levels in the ATH raw materials simply by adjusting the subsequent chlorination temperature. For fully converted ATH, where the soda level in the aluminous product is typically about 0.005 ppm, the minimum operating chlorination temperatures is about 440° C., while for unconverted ATH (where soda level in the aluminous productis typically 0.4%) the temperature is about 610° C. Partially converted ATH will have an intermediate minimum operating temperature, e.g., 50% converted ATH will typically have about 0.15% soda in the partially calcined product and a minimum operation temperature of 537° C. The actual operating temperature is dictated by kinetics and heat balance of the chlorination reaction. However, it is clear that the lower the soda levels in the feed product to the chlorinator the lower the possible operating temperature. This has a substantial economical advantage in producing anhydrous $AlCl_3$, because of the decrease in corrosion of reactor as a result of lower operating temperature and less of the corrosive $NaAlCl_4$. In addition, less reductant (e.g., carbon) is required in the reaction at low temperature.

For example, at or below 700° C., consumption of carbon reductant is typically 0.4 lb/lb of aluminum whereas at 900° C. the carbon consumption approaches 0.67 lb/lb aluminum.

In general, the fully or partially calcined ACH prepared according to the present invention is sufficiently activated to enable chlorination to be effected in the presence of virtually any reductant known in the art to be useful for reductive chlorination. Reductants useful in the chlorination of dehydrated ACH calcined according to the present invention are carbonaceous materials and include gaseous reducing agents such as carbon monoxide and producer gas (mixtures of carbon monoxide, carbon dioxide, and hydrogen) as taught by U.S. Pat. No. 4,264,569; $COCl_2$, $CCl_4$ or mixtures thereof; and/or solid reductants, such as partially calcined green coke according to the teaching of U.S. Pat. No. 4,284,607, activated carbon derived from coal according to the teaching of U.S. Pat. No. 4,105,752; activated fully calcined coke; or even fully calcined coke. Even though it has heretofore been well known to those skilled in the art that using fully calcined coke for reductive chlorination of aluminous material results in a poor chlorination rate, particularly at low chlorination temperatures, it has been found that it can be used, provided it is combined with ACH calcined according to the present invention. Each reductant offers advantages and also some disadvantages; thus the selection of the specific reductant will depend on the desired overall process circumstances.

Chlorination in the present invention may be carried out at pressures ranging from about 0.1 atm to about 15 atm, preferably from about 1–5 atm, and at temperatures from about 400°–950° C., preferably 550°–750° C., depending on the reductant, its impurities and the soda content in the material to be calcined. As will be understood by those skilled in the art, it is preferable from an energy savings point of view to effect chlorination at lower temperatures when possible, the temperatur being determined by the level of activation of the material to be chlorinated and by the level of soda impurity present. The anhydrous $AlCl_3$ so provided from the chlorination of the product of this invention is suitable for use as feed to an aluminum electrolytic production cell.

The examples below will illustrate the process of this invention.

EXAMPLE 1

Control (ACH)

100 grams of ACH derived from single stage crystallization of acid leached clay were calcined for 2 hours at 700° C. in a rotary kiln using air as a carrier gas. The off-gases, water and HCl were scrubbed. The $Al_2O_3$ product contained the following impurities:

| Impurities | Amount, ppm |
| --- | --- |
| $P_2O_5$ | 0.01 |
| MgO | 0.01 |
| $K_2O$ | 0.005 |
| $Fe_2O_3$ | 0.005 |
| $SiO_2$ | 0.005 |
| CaO | 0.03 |
| $Na_2O$ | 0.005 |
| Cl | 6.7 |
| $H_2$ | 0.24 |

EXAMPLE 2

Control (alumina)

100 gm of Bayer Process ATH ($Al_2O_3 \cdot 3H_2O$) were partially calcined as in Example 1. The product of this calcination contained the following impurities:

| Impurities | Amount, ppm |
|---|---|
| $P_2O_5$ | 0.003 |
| MgO | 0.006 |
| $K_2O$ | 0.005 |
| $Fe_2O_3$ | 0.04 |
| $SiO_2$ | 0.02 |
| CaO | 0.03 |
| $Na_2O$ | 0.45 |
| Cl | none |
| $H_2$ | 0.13 |

It is clear that the alumina product from acid leaching of aluminuous ores (Example 1) has substantially lower levels of soda as well as other impurities, as compared to the Bayer Process ATH (Example 2).

EXAMPLE 3

Fully converted ATH 100 gm of Bayer Process ATH were fully converted to ACH which was calcined in a rotary kiln at 650° C. for 2 hours. The alumina product from this calcination contained the following major impurities:

| Impurities | Amount, % |
|---|---|
| $P_2O_5$ | 0.003 |
| $Fe_2O_3$ | 0.003 |
| $SiO_2$ | 0.005 |
| CaO | 0.001 |
| $Na_2O$ | 0.004 |
| Cl | 5.1 |
| $H_2$ | 0.1 |

Comparing the data in Example 1 and Example 3, it becomes apparent that the present process can produce a similar quality alumina product with regard to soda levels and Cl/H molar ratios. The present invention thus avoids the high energy and capital requirements of acid leaching while still producing the desired product.

EXAMPLE 4

Partial conversion of ATH 100 gm of 54% converted ATH were calcined as in Example 1 and the product was found to contain the following major impurities:

| Impurities | Amount, % |
|---|---|
| $Fe_2O_3$ | 0.002 |
| $SiO_2$ | 0.02 |
| CaO | 0.005 |
| $Na_2O$ | 0.09 |
| Cl | 3.5 |
| $H_2$ | 0.25 |

Comparing the results of Examples 2, 3 and 4, it is clear that the soda level in the product from partially converted ATH is intermediate between that of the products of unconverted ATH (Example 2) and fully converted ATH (Example 3). The chlorine level is proportionate to the percentage of ACH in the partially converted product. In addition, the Cl/H ratio is more favorable in terms of chlorine consumption than that of unconverted ATH.

EXAMPLE 5

Control of chlorination 25 gm of feed material (80% of aluminous product from Example 1 and 20% of activated carbon) was chlorinated in 1" fluidized bed reactor at 650° C. The results of chlorination measured by the amount of aluminum chloride produced per unit time are as follows:

| Time, min | Relative Rate Of $AlCl_3$ Production, gm/min |
|---|---|
| 120 | 0.133 |
| 255 | 0.144 |

The average relative rate of $AlCl_3$ production is about 0.138 gm/min.

EXAMPLE 6

Chlorination of calcined (unconverted) ATH 25 gm of feed material (80% alumina product from Example 2 and 20% of activated carbon) were chlorinated as in Example 5. The average chlorination rate was about 0.11 gm $AlCl_3$/min.

EXAMPLE 7

Chlorination of partially converted ATH 25 gm of feed material (80% aluminous product from Example 4 and 20% of activated carbon) was also chlorinated as per Example 5. The average chlorination rate was again slightly higher (0.154 gm $AlCl_3$/min) than that of the acid leach derived aluminous material.

EXAMPLE 8

Chlorination of fully converted ATH 25 gm of feed material (80% aluminous product from Example 3 and 20% of activated carbon) was chlorinated as in Example 5. The results showed that the average chlorination rate is about 0.15 gm $AlCl_3$/min. This indicates that the partially calcined ACH from converting ATH according to this invention has a chlorination rate as good as or better than that of acid leach derived aluminous material.

INDUSTRIAL APPLICABILITY

The process of this invention and the resultant anhydrous aluminum chloride product are applicable to the industrial production of aluminum metal. The product is a raw material from which aluminum can be produced with less energy usage than required for conventional Hall process aluminum production.

It will be immediately evident to those skilled in the art that the invention herein encompasses embodiments which, while not specifically described above, are clearly within the scope and spirit of the invention. Consequently, the scope of the present invention is to be determined solely by the appended claims.

We claim:

1. A process for conversion of hydrated alumina to anhydrous aluminum chloride which consists essentially of:

a. reacting solid hydrated alumina with concentrated hydrochloric acid in a concentration of 15–35% to convert at least a portion of the hydrated alumina directly to an aluminum chloride hexahydrate which spontaneously precipitates as all or part of a solid product;

b. recovering a solid product from said conversion, said product consisting essentially of aluminum chloride hexahydrate or a mixture of aluminum chloride hexahydrate and unreacted hydrated alumina;

c. partially calcining said solid product of step (b) to produce an amorphous mixture of aluminum oxides and oxychlorides with a low content of water and HCl; and d. chlorinating the mixture of step (c) in the presence of a reductant to form anhydrous aluminum chloride.

2. A process as in claim 1 wherein said hydrated alumina is fully converted to aluminum chloride hexahydrate in step (a).

3. A process as in claims 1 or 2 wherein said hydrated alumina is alumina trihydrate.

4. A process as in claim 3 wherein said alumina trihydrate is a product of the Bayer Process.

5. A process as in claims 1 or 2 wherein said hydrochloric acid has a concentration in the range of about 20-30%.

6. A process as in claims 1 or 2 wherein said partial calcination is carried out in at least two stages, the first stage at a temperature in the range of 200°-400° C. and the second stage at a temperature in the range of 450°-1000° C.

7. A process as in claims 1 or 2 wherein said reductant in step (d) is a carbonaceous material.

8. A process as in claims 1 or 2 wherein said calcination is conducted so as to reduce the residual hydrogen level and increase the residual chloride level.

9. A process as in claim 8 wherein the molar ratio of Cl/H approaches one.

10. A process as in claims 1 or 2 wherein said chlorination is conducted at a temperature of at least about 440°-610° C., which minimum temperature is dependent on the soda content of solid hydrated alumina.

* * * * *